United States Patent
Ooshima

(10) Patent No.: US 9,704,279 B2
(45) Date of Patent: Jul. 11, 2017

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventor: Kazuki Ooshima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/069,358

(22) Filed: Mar. 14, 2016

(65) Prior Publication Data

US 2016/0292898 A1 Oct. 6, 2016

(30) Foreign Application Priority Data

Mar. 30, 2015 (JP) ................................. 2015-069473

(51) Int. Cl.

| | | |
|---|---|---|
| G06T 11/60 | (2006.01) | |
| G06F 3/0481 | (2013.01) | |
| G06F 3/0484 | (2013.01) | |
| G10L 15/26 | (2006.01) | |
| G10L 25/90 | (2013.01) | |
| G10L 17/26 | (2013.01) | |

(52) U.S. Cl.
CPC .......... *G06T 11/60* (2013.01); *G06F 3/04817* (2013.01); *G06F 3/04845* (2013.01); *G10L 15/26* (2013.01); *G10L 17/26* (2013.01); *G10L 25/90* (2013.01)

(58) Field of Classification Search
CPC .. G06T 11/60; G06F 3/04845; G06F 3/04817; G10L 15/26; G10L 25/90; G10L 17/26
USPC ...................................................... 382/181
See application file for complete search history.

(56) References Cited

U.S. PATENT DOCUMENTS

| | | | | |
|---|---|---|---|---|
| 8,611,724 B2* | 12/2013 | Masutani | ............. | H04N 9/8205 |
| | | | | 386/239 |
| 2005/0068584 A1* | 3/2005 | Kawaoka | ................ | G06T 11/60 |
| | | | | 358/1.18 |

FOREIGN PATENT DOCUMENTS

| | | |
|---|---|---|
| JP | 2003-085572 A | 3/2003 |
| JP | 4226237 B2 | 2/2009 |
| JP | 4881980 B2 | 2/2012 |
| JP | 2012-249211 A | 12/2012 |
| JP | 2014-095753 A | 5/2014 |

OTHER PUBLICATIONS

Fujifilm Corporation; Moving Image Photo! Service; [online]; retrieved on Feb. 9, 2015; Internet <URL: http://fujifilm.jp/personal/print/photo/dogaphoto/>.

* cited by examiner

*Primary Examiner* — Amandeep Saini
(74) *Attorney, Agent, or Firm* — Studebaker & Brackett PC

(57) ABSTRACT

In the image processing device, a display section displays, based on association information, association information between an icon indicating a central person and a character string corresponding to a voice of the central person. An instruction reception section receives a target person designation instruction for designating a central person corresponding to an icon selected by the user as a combination target person, and then, a combination section combines a frame image at an arbitrary time point when the target person is present with a character image of a character string corresponding to a voice of the target person in an arbitrary time period, according to the target person designation instruction, to generate a composite image.

29 Claims, 11 Drawing Sheets

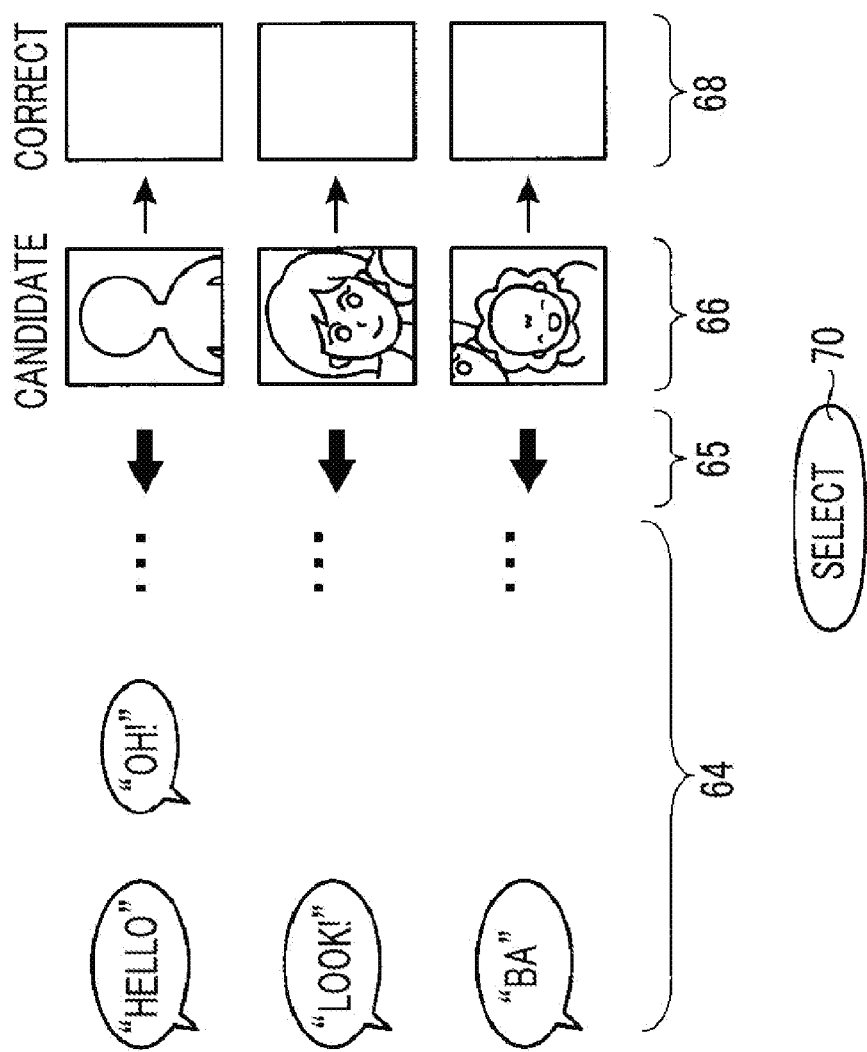

IMAGE PROCESSING DEVICE, IMAGE PROCESSING METHOD, PROGRAM, AND RECORDING MEDIUM

CROSS-REFERENCE TO RELATED APPLICATIONS

The present application claims priority under 35 U.S.C. §119 to Japanese Patent Application No. 2015-069473, filed Mar. 30, 2015, all of which are hereby expressly incorporated by reference into the present application.

BACKGROUND OF THE INVENTION

1. Field of the Invention

The present invention relates to an image processing device, an image processing method, a program and a recording medium for combining a frame image extracted from a moving image and a character image of a character string corresponding to a voice of a person who is present in the frame image to generate a composite image.

2. Description of the Related Art

In recent years, portable terminals such as a smart phone or a tablet terminal have rapidly spread, and the number of still images (photographs) captured by these portable terminals has increased. In this regard, opportunities to capture a moving image have also increased. Recently, as a service that uses a moving image, as disclosed in "Moving Image Photo! Service", [online], Fujifilm Corporation, [Retrieved on Feb. 9, 2015], Internet <URL: http://fujifilm.jp/personal/print/photo/dogaphoto/>, a system that images (captures) printed matter such as a photograph using a portable terminal and then reproduces (AR-reproduces) a moving image related to the printed matter on a screen of the portable terminal using an augmented reality (AR) technique has been proposed.

In such a system, the AR reproduction of the moving image related to the printed matter is performed according to the following steps (1) to (6).

(1) If a user selects a moving image to be printed from among plural moving images using a dedicated-use application operated on a portable terminal, the selected moving image is uploaded to a server.

(2) The server extracts a representative frame image from the moving images uploaded from the portable terminal.

(3) The representative frame image extracted by the server is downloaded to the portable terminal.

(4) The user selects a frame image to be printed from among the representative frame images which are displayed as a list on a screen of the portable terminal, and makes a printing order.

(5) The server generates a printed matter (hereinafter, referred to as a moving image print) of the frame image ordered by the user, and performs image processing for a moving image associated with the frame image for AR reproduction.

(6) After the delivered printed matter is imaged (captured) using the portable terminal, the user downloads the moving image for AR reproduction associated with the printed matter from the server to be reproduced on the screen of the portable terminal based on the AR technique.

As in the above-described system, in a system that prints a frame image extracted from a moving image, a printed matter of a frame image in a state of being extracted from the moving image is generated.

In this regard, in techniques disclosed in JP2003-85572A, Japanese Patent No. 4226237, and JP2012-249211A, a frame image and a voice are extracted from a moving image, a person is extracted from the frame image, the voice is converted into a character string, and a frame image and a character string corresponding to a voice of a person who is present in the frame image are combined in a text balloon form to generate a composite image. Further, JP2014-95753A and Japanese Patent No. 4881980 disclose techniques that determine a gender and an age from a voice, and Japanese Patent No. 4881980 discloses techniques that further determine a gender and an age from a video image.

SUMMARY OF THE INVENTION

In the techniques disclosed in JP2003-85572A, Japanese Patent No. 4226237, and JP2012-249211A, since the frame image and the character string corresponding to the voice of the person who is present in the frame image are combined in a text balloon form, it is possible to generate a composite image with an enhanced attraction. However, in the techniques disclosed in JP2003-85572A, Japanese Patent No. 4226237, and JP2012-249211A, a frame image and a character string corresponding to a voice when the frame image is captured are combined, and for example, character strings corresponding to voices at other time points cannot be combined. Accordingly, there is no variation in the composite image.

On the other hand, in a case where frame images and character strings corresponding to voices at time points other than the time point when the frame image is captured are combined, it is necessary to select a voice of a person who is present in a frame image to be combined with a character string corresponding to the voice from voices extracted from the moving image. However, in a case where plural persons are present in the moving image, a considerable effort is necessary for determining which person a voice belongs to, or for selecting a desired voice from plural voices of the person.

In order to solve the above-mentioned problems, an object of the invention is to provide an image processing device, an image processing method, a program, and a recording medium capable of simply combining a frame image and a character image of a character string corresponding to a voice of a person who is present in the frame image to generate various composite images.

According to an aspect of the invention, there is provided an image processing device including: a frame image extraction section that extracts a plurality of frame images from a moving image; a person region detection section that detects at least a partial region of a person who is present in each frame image as a person region; a person specifying section that specifies a person corresponding to the detected person region; a person evaluation section that evaluates the person region in at least a part of the plurality of extracted frame images for each specified person and calculates an evaluation score for the specified person in the moving image; a central person determination section that determines, in a case where the evaluation score for the specified person is greater than a specific value, that the specified person is a central person in the moving image; a voice extraction section that extracts a voice from the moving image; a voice recognition section that converts the voice into character string data by voice recognition; an association section that generates information of association between the central person and a voice of the central person; a display section that displays association information between an icon indicating the central person and a character string corresponding to at least a part of character string data of the voice of the central person, based on the association information generated by the association section; an instruction reception section that receives an instruction input from a user; and a combination section that combines the frame image and a character image corresponding to the character string, in which the instruction reception section further receives a target person designation instruction for designating a central person corresponding to an icon selected from among the icons by the user as a combination target person, and the combination section further reads a combination frame image at an arbitrary time point when the target person is present according to the target person designation instruction, reads a combination character string corresponding to character string data of a voice of the target person in an arbitrary time period based on the association information displayed on the display section, and combines the combination frame image and a character image corresponding to the combination character string to generate a composite image.

In the image processing device, it is preferable that the instruction reception section further receives a correction instruction for correcting, with respect to the association information displayed on the display section, the association information, and the association section further corrects the association information according to the correction instruction.

It is preferable that the image processing device further includes: a representative frame image determination section that determines a representative frame image from among the frame images where the target person is present according to the target person designation instruction; and a representative character string determination section that determines a representative character string from among the character strings corresponding to the character string data of the voice of the target person according to the target person designation instruction, and the combination section combines the representative frame image and a character image corresponding to the representative character string.

In the image processing device, it is preferable that the representative frame image determination section determines a frame image where at least one of a tone, brightness, and blurring is within a specific range from among the frame images where the target person is present as the representative frame image.

In the image processing device, it is preferable that the representative frame image determination section determines a frame image where at least one of a size and a direction of the face of the target person is within a specific range and an expression of the target person is smiling from among the frame images where the target person is present as the representative frame image.

In the image processing device, it is preferable that the representative frame image determination section determines a frame image where at least one of a talking scene, a large amount of movement scene, and a loud voice scene of the target person is present from among the frame images where the target person is present as the representative frame image.

In the image processing device, it is preferable that the representative character string determination section determines a character string corresponding to character string data of a voice where at least one of the loudness and the pitch of the voice of the target person is within a specific range from among the character strings corresponding to the character string data of the voice of the target person as the representative character string.

In the image processing device, it is preferable that the representative character string determination section determines a character string corresponding to character string data of a voice containing a most frequently-used word from among the character strings corresponding to the character string data of the voice of the target person as the representative character string.

In the image processing device, it is preferable that the display section further displays the representative frame image where the target person is present and a frame image, other than the representative frame image, which is a frame image where the target person is present, the instruction reception section further receives a frame image designation instruction for designating a frame image input from the user among the frame images displayed on the display section, and the representative frame image determination section further re-determines the frame image designated by the user according to the frame image designation instruction as the representative frame image.

In the image processing device, it is preferable that the display section further displays the representative character string and a character string, other than the representative character string, which is a character string corresponding to the voice data of the voice of the target person, the instruction reception section further receives a character string designation instruction for designating a character string input from the user among the character strings displayed on the display section, and the representative character string determination section further re-determines the character string designated by the user according to the character string designation instruction as the representative character string.

In the image processing device, it is preferable that the voice recognition section preferentially converts the voice of the target person among the voices extracted from the moving image into character string data.

In the image processing device, it is preferable that the voice extraction section performs noise canceling for removing noise from the voice extracted from the moving image.

In the image processing device, it is preferable that the association section determines the gender and age of the central person from a person region of a frame image where the central person is present, determines, from the pitch of the voice of the central person, the gender and age of a person corresponding to the voice, and generates the association information so that the gender and age of the central person match the gender and age of the person corresponding to the voice.

In the image processing device, it is preferable that in a case where the association information is generated, the association section does not use a voice in a sound range other than a sound range of a voice of a human being.

In the image processing device, it is preferable that the association section determines whether or not the moving image includes data indicating association between a person who is present in the moving image and a voice of the person who is present in the moving image as supplementary information, and generates, when it is determined that the moving image includes data indicating association, the association information based on the data indicating the association.

In the image processing device, it is preferable that the combination section combines the character string in at least one form of a text balloon, a telop, and a subtitle.

In the image processing device, it is preferable that the combination section changes a style of type of the character string according to content of the character string.

In the image processing device, it is preferable that the combination section generates a composite image including a plurality of frame images which is combined with the character images of the character strings.

According to another aspect of the invention, there is provided an image processing device including: a frame image extraction section that extracts a plurality of frame images from a moving image; a person region detection section that detects at least a partial region of a person who is present in each frame image as a person region; a person specifying section that specifies a person corresponding to the detected person region; a person evaluation section that evaluates the person region in at least a part of the plurality of extracted frame images for each specified person and calculates an evaluation score for the specified person in the moving image; a central person determination section that determines, in a case where the evaluation score for the specified person is greater than a specific value, that the specified person is a central person in the moving image; a voice extraction section that extracts a voice from the moving image; a voice recognition section that converts the voice into character string data by voice recognition; an association section that generates association information between the central person and a voice of the central person, determines that a person who is not present in the frame image and whose voice extracted from the moving image occurs more frequently than a specific value as a non-subject person, and generates association information between the non-subject person and a voice of the non-subject person; a display section that displays association information between icons indicating the central person and the non-subject person and a character string corresponding to at least a part of character string data of the voices of the central person and the non-subject person, based on the association information generated by the association section; an instruction reception section that receives an instruction input from a user; and a combination section that combines the frame image and a character image corresponding to the character string, in which the instruction reception section further receives a target person designation instruction for designating a central person or a non-subject person corresponding to an icon selected from among the icons by the user as a combination target person, and the combination section further reads a combination character string corresponding to character string data of a voice of the target person in an arbitrary time period when the voice of the target person is present based on the association information displayed on the display section according to the target person designation instruction, reads a combination frame image at an arbitrary time point when the central person is present, and combines a character image corresponding to the combination character string and the combination frame image to generate a composite image.

According to still other aspect of the invention, there is provided an image processing device including: a frame image extraction section that extracts a plurality of frame images from a moving image; a person region detection section that detects at least a partial region of a person who is present in each frame image as a person region; a person specifying section that specifies a person corresponding to the detected person region; a person evaluation section that evaluates the person region in at least a part of the plurality of extracted frame images for each specified person and calculates an evaluation score for the specified person in the moving image; a central person determination section that determines, in a case where the evaluation score for the specified person is greater than a specific value, that the specified person is a central person in the moving image; a voice extraction section that extracts a voice from the moving image; a voice recognition section that converts the voice into character string data by voice recognition; an association section that generates association information between the central person and a voice of the central person, determines that a person who is not present in the frame image and whose voice extracted from the moving image occurs more frequently than a specific value as a non-subject person, and generates association information between the non-subject person and a voice of the non-subject person; a display section that displays association information between an icon indicating the central person and a character string corresponding to at least a part of character string data of the voice of the central person, based on the association information generated by the association section; an instruction reception section that receives an instruction input from a user; and a combination section that combines the frame image and a character image corresponding to the character string, in which the instruction reception section further receives a target person designation instruction for designating a central person corresponding to an icon selected from among the icons by the user as a combination target person, and the combination section further reads a combination frame image at an arbitrary time point when the central person is present according to the target person designation instruction, reads a combination character string corresponding to character string data of a voice of an arbitrary one of the target person and the non-subject person in an arbitrary time period based on the association information displayed on the display section, and combines the combination frame image and a character image corresponding to the combination character string to generate a composite image.

In the image processing device, it is preferable that the combination section further combines the combination character string in a text balloon form of which a tail is directed toward a lower side of the composite image.

According to still another aspect of the invention, there is provided an image processing method including the steps of: extracting a plurality of frame images from a moving image, by a frame image extraction section; detecting at least a partial region of a person who is present in each frame image as a person region, by a person region detection section; specifying a person corresponding to the detected person region, by a person specifying section; evaluating the person region in at least a part of the plurality of extracted frame images for each specified person and calculating an evaluation score for the specified person in the moving image, by a person evaluation section; determining, in a case where the evaluation score for the specified person is greater than a specific value, that the specified person is a central person in the moving image, by a central person determination section; extracting a voice from the moving image, by a voice extraction section; converting the voice into character string data by voice recognition, by a voice recognition section; generating association information between the central person and a voice of the central person, by an association section; displaying association information between an icon indicating the central person and a character string corresponding to at least a part of character string data of the voice of the central person, based on the association information generated by the association section, by a display section; receiving a correction instruction for correcting, with respect to the association information displayed on the display section, the association information input from a user, by an instruction reception section; further correcting the association information according to the correction instruction, by the association section; further receiving a target person designation instruction for designating a central person corresponding to an icon selected from among the icons by the user as a combination target person, by the instruction reception section; and reading a combination frame image at an arbitrary time point when the target person is present according to the target person designation instruction, reading a combination character string corresponding to character string data of a voice of the target person in an arbitrary time period based on the association information displayed on the display section, and combining the combination frame image and a character image corresponding to the combination character string to generate a composite image, by a combination section.

It is preferable that the image processing method further includes the steps of: receiving a correction instruction for correcting, with respect to the association information displayed on the display section, the association information, by the instruction reception section; and correcting the association information according to the correction instruction, by the association section.

It is preferable that the image processing method further includes the steps of: determining a representative frame image from among the frame images where the target person is present according to the target person designation instruction, by a representative frame image determination section; and determining a representative character string from among the character strings corresponding to the character string data of the voice of the target person according to the target person designation instruction, by a representative character string determination section, in which the combination section combines the representative frame image and a character image corresponding to the representative character string.

It is preferable that the image processing method further includes the steps of: displaying the representative frame image where the target person is present and a frame image, other than the representative frame image, which is a frame image where the target person is present, by the display section; receiving a frame image designation instruction for designating a frame image input from the user among the frame images displayed on the display section, by the instruction reception section; and re-determining the frame image designated by the user according to the frame image designation instruction as the representative frame image, by the representative frame image determination section.

It is preferable that the image processing method further includes the steps of: displaying the representative character string and a character string, other than the representative character string, which is a character string corresponding to the voice data of the voice of the target person, by the display section; receiving a character string designation instruction for designating a character string input from the user among the character strings displayed on the display section, by the instruction reception section; and re-determining the character string designated by the user according to the character string designation instruction as the representative character string, by the representative character string determination section.

According to still another aspect of the invention, there is provided an image processing method including the steps of: extracting a plurality of frame images from a moving image, by a frame image extraction section; detecting at least a partial region of a person who is present in each frame image as a person region, by a person region detection section; specifying a person corresponding to the detected person region, by a person specifying section; evaluating the person region in at least a part of the plurality of extracted frame images for each specified person and calculating an evaluation score for the specified person in the moving image, by a person evaluation section; determining, in a case where the evaluation score for the specified person is greater than a specific value, that the specified person is a central person in the moving image, by a central person determination section; extracting a voice from the moving image, by a voice extraction section; converting the voice into character string data by voice recognition, by a voice recognition section; generating association information between the central person and a voice of the central person, determining that a person who is not present in the frame image and whose voice extracted from the moving image occurs more frequently than a predetermined specific value as a non-subject person, and generating association information between the non-subject person and a voice of the non-subject person, by an association section; displaying association information between icons indicating the central person and the non-subject person and a character string corresponding to at least a part of character string data of the voices of the central person and the non-subject person, based on the association information generated by the association section, by a display section; receiving a target person designation instruction for designating a central person or a non-subject person corresponding to an icon selected from among the icons by the user as a combination target person, by an instruction reception section; and reading a combination character string corresponding to character string data of a voice of the target person in an arbitrary time period when the voice of the target person is present based on the association information displayed on the display section according to the target person designation instruction, reading a combination frame image at an arbitrary time point when the central person is present, and combining a character image corresponding to the combination character string and the combination frame image to generate a composite image, by a combination section.

According to still another aspect of the invention, there is provided an image processing method including the steps of: extracting a plurality of frame images from a moving image, by a frame image extraction section; detecting at least a partial region of a person who is present in each frame image, by a person region detection section; specifying a person corresponding to the detected person region, by a person specifying section; evaluating the person region in at least a part of the plurality of extracted frame images for each specified person and calculating an evaluation score for the specified person in the moving image, by a person evaluation section; determining, in a case where the evaluation score for the specified person is greater than a specific value, that the specified person is a central person in the moving image, by a central person determination section; extracting a voice from the moving image, by a voice extraction section; converting the voice into character string data by voice recognition, by a voice recognition section; generating association information between the central person and a voice of the central person, determining that a person who is not present in the frame image and whose voice extracted from the moving image occurs more frequently than a predetermined specific value as a non-subject person, and generating association information between the non-subject person and a voice of the non-subject person, by an association section; displaying association information between an icon indicating the central person and a character string corresponding to at least a part of character string data of the voice of the central person, based on the association information generated by the association section, by a display section; receiving a correction instruction for correcting, with respect to the association information displayed on the display section, the association information input from a user, by an instruction reception section; further correcting the association information according to the correction instruction, by the association section; further receiving a target person designation instruction for designating a central person corresponding to an icon selected from among the icons by the user as a combination target person, by the instruction reception section; and reading a combination frame image at an arbitrary time point when the target person is present according to the target person designation instruction, reading a combination character string corresponding to character string data of a voice of an arbitrary one of the central person and the non-subject person in an arbitrary time period based on the association information displayed on the display section, and combining the combination frame image and a character image corresponding to the combination character string to generate a composite image, by a combination section.

According to still another aspect of the invention, there is provided a program that causes a computer to execute the steps of the above-described image processing method.

According to still another aspect of the invention, there is provided a computer-readable recording medium that stores a program that causes a computer to execute the steps of the above-described image processing method.

According to the invention, by combining a frame image and a character image of a character string corresponding to character string data of a voice of a person in a moving image, it is possible to generate a composite image with an enhanced attraction. Further, since association between persons and voices is performed using association information, it is possible to visually recognize correspondence between the person and the voices, and to easily and freely select frame images and character string data corresponding to voices.

Further, in this description, association between a central person and a voice of the central person is performed, and a representative frame image and a representative character string of a target person are automatically determined. A user can select the representative frame image and the representative character string of the target person which are automatically determined, or can freely select a frame image at an arbitrary time point and a character string in an arbitrary time period from among frame images and character strings of other target persons.

Thus, according to the invention, it is possible to combine a frame image at an arbitrary time point when the target person is present and a character image of a character string corresponding to character string data of a voice of the target person in an arbitrary time period, and thus, it is possible to generate various composite images. Further, a user can simply select a frame image at an arbitrary time point when a target person is present and a character image of a character string corresponding to a voice, in the arbitrary time period, of a person who is present in the frame image for combination.

BRIEF DESCRIPTION OF THE DRAWINGS

FIG. 12 is a conceptual diagram illustrating an example of association information between non-subject persons and voices thereof.

DESCRIPTION OF THE PREFERRED EMBODIMENTS

Hereinafter, an image processing device, an image processing method, a program, and a recording medium of the invention will be described in detail based on preferred embodiments shown in the accompanying drawings.

Figure 1:
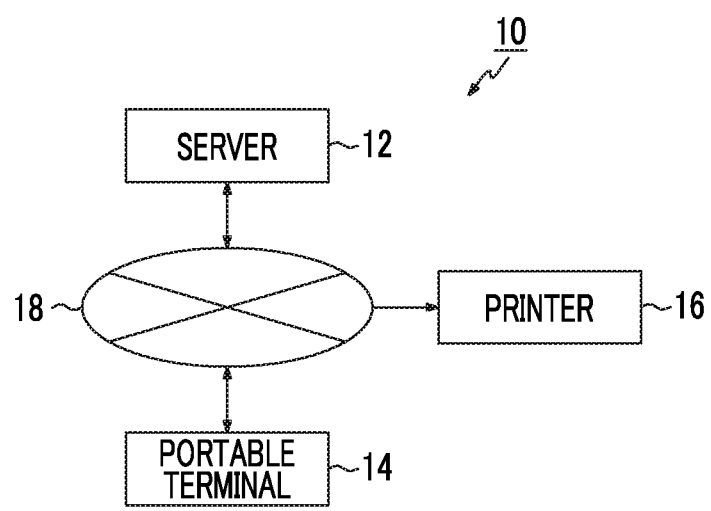
FIG. 1 is a block diagram illustrating an embodiment of a configuration of an image processing device of the invention.

FIG. 1 is a block diagram illustrating an embodiment of a configuration of an image processing device of the invention. An image processing device 10 shown in FIG. 1 generates a composite image by combining a frame image extracted from a moving image and a character image of a character string corresponding to a voice of a person who is present in the frame image, and reproduces and displays, in a case where an output image (moving image print) of the composite image is captured, a moving image associated with the output image.

The image processing device 10 includes a server 12, a portable terminal 14, and a printer 16. The server 12, the portable terminal 14, and the printer 16 are connected to each other through a network 18 such as the Internet.

Figure 2:
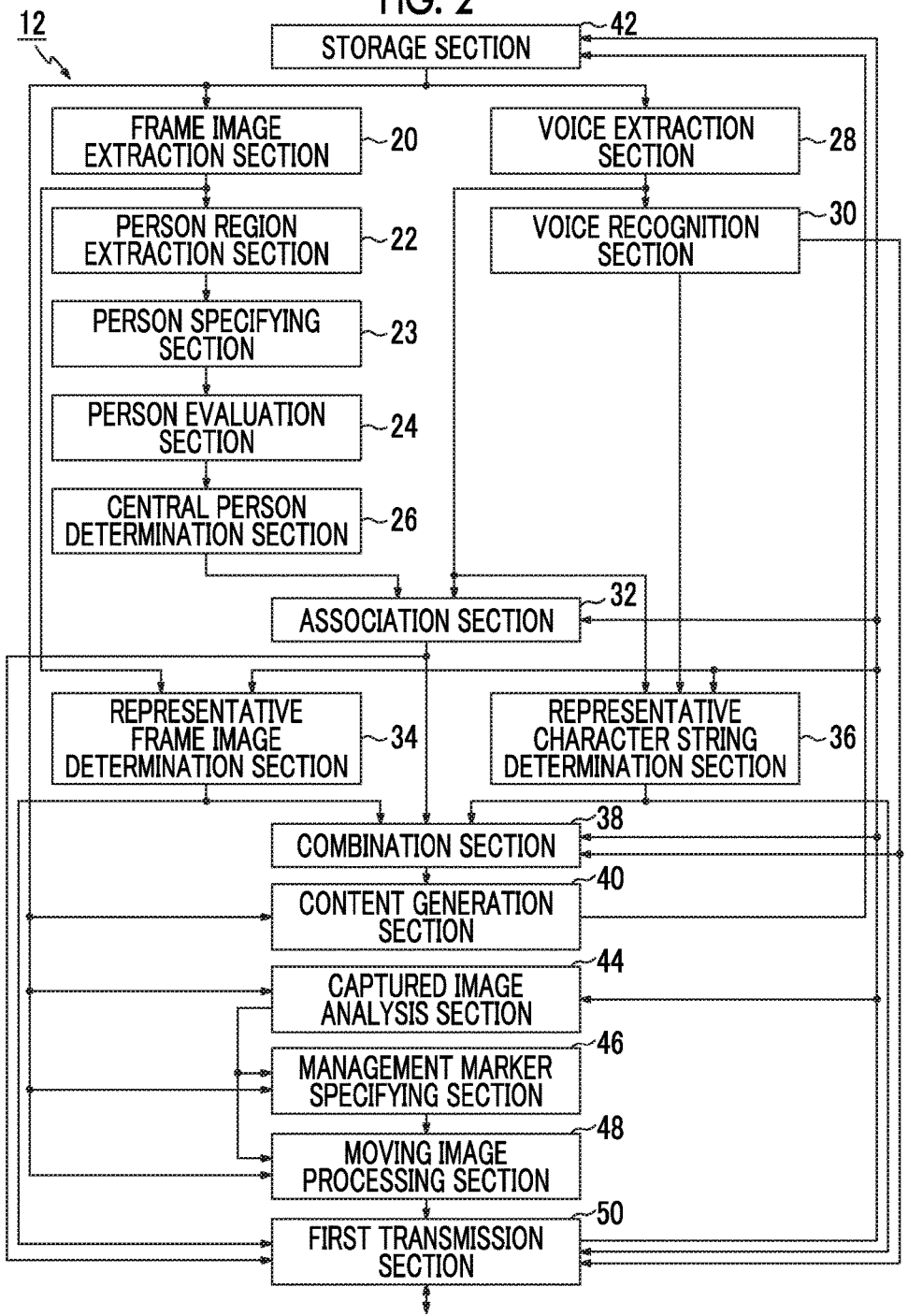
FIG. 2 is a block diagram illustrating an embodiment of a configuration of a server shown in FIG. 1.

FIG. 2 is a block diagram illustrating an embodiment of a configuration of the server shown in FIG. 1. The server 12 has one or more CPU (Central Processing Unit) which is not shown in the figure. The CPU performs by various programs are loaded thereon, and as shown in FIG. 2, a frame image extraction section 20, a person region detection section 22, a person specifying section 23, a person evaluation section 24, a central person determination section 26, a voice extraction section 28, a voice recognition section 30, an association section 32, a representative frame image determination section 34, a representative character string determination section 36, a combination section 38, a content generation section 40, a storage section 42, a captured image analysis section 44, a management marker specifying section 46, a moving image processing section 48, and a first transmission section 50 is controlled.

The frame image extraction section 20 extracts plural frame images from a moving image.

Here, a method of extracting frame images from a moving image is not particularly limited. For example, a user may manually extract desired frame images from a moving image, or frame images may be extracted from a moving image at a predetermined specific time interval.

Alternatively, using a key frame extraction (KFE) technique, a frame image which serves as a key in a scene change, for example, may be extracted. In the KFE technique, for example, each frame image of a moving image is analyzed, and a color tone, brightness, blurring, and the like of the frame image are detected. Then, a frame image before or after the color tone or brightness is greatly changed, or a frame image in which blurring does not occur due to appropriate exposure is extracted.

Further, a size, a direction, and an expression (a smiling face, a crying face, or the like) of the face of a person in a moving image may be detected, and a frame image may be extracted based on the detection result. Further, in a case where a voice is included in a moving image, a frame image may be extracted from the moving image before or after a time point (time code) when the volume of the voice is larger than certain standard or the voice becomes louder than other scene. It is preferable that extracting a frame image from a scene of which amount of movement is large, that is the amount of movement is larger than other scene or larger than certain standard by analyzing a movement of a person in every scene. By extracting a frame image from a moving image using the above-described method, it is possible to extract a representative scene of the moving image as a frame image.

The person region detection section 22 extracts at least a partial region of a person who is present in each frame image extracted from a moving image by the frame image extraction section 20, for example, a face region as a person region.

A method of detecting the region of the person who is present in the frame image is known, and its specific detection method is not particularly limited. Further, the face region may not be the face as it is. For example, a rectangular region including the face may be taken as the person region.

The person specifying section 23 specifies a person corresponding to a person region detected by the person region detection section 22.

The person specifying section 23 does not need to specifically specify the person corresponding to the person region, and has only to specify, in a case where a different person is present in the person region, that each person who is present in the person region is the different person. Further, when specifying a person, internal management may be performed based on a feature amount instead of face data.

A specific method of specifying a person corresponding to a person region from the person region (still image) is not particularly limited.

The person evaluation section 24 evaluates a person region in at least a part of plural frame images detected by the person region detection section 22 for each person specified by the person specifying section 23, and calculates an evaluation score for the specified person in a moving image.

A specific method of evaluating a person region to calculate an evaluation score for a person who is present in the person region is not particularly limited, but for example, the evaluation may be performed based on the face of the person included in the person region, or based on blurring, color tone, brightness, or the like of the person region. For example, in a case where the face of a person is directed to a front side and is smiling and the size of the face is equal to or greater than a threshold value, in a case where the degree of blurring is smaller than a predetermined threshold value, or in a case where the color tone, the brightness, or the opening degree of the eyes is within a predetermined specific range, the evaluation score for the person is high.

The central person determination section 26 determines, in a case where an evaluation score for a person specified by the person specifying section 23 is greater than a predetermined specific value, that the specified person is a central person in a moving image. The central person may be one person, or may be plural persons.

In a specific determination method of the central person, for example, a same person determination process is performed with respect to persons included in plural person regions, and the plural person regions are classified into plural person groups that respectively includes person regions of the same person. The same person determination process is also known, and according to this process, it is determined whether or not persons included in plural person regions show the same person by image analysis. Further, a total value of evaluation scores for a person included in person regions of each group is calculated, and it is determined that a person whose total value is greater than a specific value is the central person.

The voice extracting section 28 extracts a voice from a moving image.

Further, the voice recognition section 30 converts a voice extracted from a moving image by the voice extraction section 28 into character string data by voice recognition.

As disclosed in JP2014-95753A and Japanese Patent No. 4881980, a method of extracting a voice from a moving image and a specific method of converting the voice into character string data by voice recognition are not particularly limited.

Subsequently, the voice recognition section 30 divides the obtained character string data based on every short time period and stores the result. Specifically, the voice recognition section 30 acquires a time point which is occupied by the character string data, and considers, in a case where a time period when the character string data is not present is longer than a specific time (for example, 1 second), pieces of character string data before and after the time period as different pieces of character string data and stores the result in the storage section 42.

Further, it is preferable that the voice extraction section 28 performs noise canceling for removing noise from a voice extracted from a moving image. Thus, it is possible to enhance the accuracy of voice recognition in the voice recognition section 30.

The association section 32 generates association information indicating association between a central person determined by the central person determination section 26 and a voice of the central person extracted from a moving image by the voice extraction section 28.

A method of generating the association information between the central person and the voice of the central person by the association section 32 includes, for example, determining the gender and age of the central person from a person region of a frame image where the central person is present, and determining the gender and age of the person corresponding to the voice from the pitch of the voice of the central person. Further, the association section 32 may generate the association information so that the gender and age of the central person match the gender and age of the person corresponding to the voice.

Further, it is preferable that the association section 32 does not use a voice in a sound range other than a sound range of a voice of a human being, for example, a sound range of 100 Hz to 4000 Hz, in a case where the association information is generated. Thus, it is possible to enhance the accuracy of association information.

The representative frame image determination section 34 determines a representative frame image corresponding to a representative scene of a target person from among frame images where the target person is present according to a target person designation instruction for designating a target person for combination (which will be described later).

A method of determining the representative frame image of the target person from among the frame images where the target person is present may include, for example, determining a frame image where at least one of a tone, brightness, and blurring is within a specific range which is set in advance, a frame image where at least one of a size and a direction of the face of the target person is within a specific range which is set in advance and an expression of the target person is smiling, or a frame image where at least one of a talking scene, a scene including a larger amount of movement than other scene, and a scene including a louder voice than other scene of the target person is present.

The representative character string determination section 36 determines a representative character string corresponding to a representative voice of a target person from among character strings corresponding to character string data of a voice of the target person according to the target person designation instruction.

A method of determining the representative character string of the target person from among the character strings corresponding to the character string data of the voice of the target person by the representative character string determination section 36 may include, for example, determining a character string corresponding to character string data of a voice where at least one of the loudness and the pitch of the voice of the target person is within a specific range which is set in advance, or a character string corresponding to character string data of a voice containing a most frequently-used word.

The combination section 38 combines a frame image of a target person and a character image of a character string corresponding to character string data of a voice of the target person according to the target person designation instruction to generate a composite image.

For example, the combination section 38 reads a combination frame image at an arbitrary time point when the target person is present from plural frame images extracted from a moving image by the frame image extraction section 20, reads a combination character string corresponding to character string data of a voice of the target person in an arbitrary time period from character strings corresponding to character string data of a voice extracted from the moving image by the voice extraction section 28 based on association information, and combines the combination frame image and the a character image corresponding to the combination character string to generate a composite image.

Further, the combination section 38 combines a representative frame image of the target person determined by the representative frame image determination section 34 and a character image corresponding to a representative character string of the target person determined by the representative character string determination section 36.

Here, when combining the combination character string, the character string may be combined in any one of form of a text balloon, a telop, and a subtitle, for example. Further, a style of type of the character string may be changed according to content of the character string. In addition, a composite image including plural frame images obtained by combining character images of character strings may be generated like a four-frame comic. Thus, it is possible to generate a variety of composite images.

The content generation section 40 generates AR content in which a moving image is associated with a composite image combined by the combination section 38 and its specifying information.

The storage section 42 stores a variety of data.

In the storage section 42, for example, in addition to a moving image transmitted from the portable terminal 14, AR content generated by the content generation section 40, that is, a composite image or its specifying information is stored in association with a moving image as a management marker of the composite image.

Here, the management marker refers to a feature amount of an image read from a still image by performing image analysis for the still image based on a predetermined algorithm, and for example, includes edge information of an imaging target included in the still image, position information of an edge, or the like. The management marker may be a still image itself, or may be specifying information for specifying the still image. The specifying information for the still image may be any information capable of specifying a composite image from a captured image.

The captured image analysis section 44 performs image analysis for a captured image obtained by capturing an output image (moving image print) of a composite image to acquire a management marker of the captured image, as described later.

The management marker specifying section 46 specifies, as a specific management marker, a management marker of a composite image corresponding to a management marker of a captured image acquired by the captured image analysis section 44 among management markers of composite images stored in the storage section 42. The management marker specifying section 46 retrieves the management markers of the composite images stored in the storage section 42 based on the management marker of the captured image, for example, to specify the management marker of the composite image corresponding to the management marker of the captured image.

The moving image processing section 48 generates an AR reproduction moving image from a related moving image associated with a specific management marker. That is, the moving image processing section 48 generates the AR reproduction moving image from the related moving image based on the specific management marker, that is, its composite image or specifying information.

The moving image processing section 48 lowers a resolution or a bit rate of the moving image, for example, in order to reduce a file size of a moving image, and generates an AR reproduction moving image with a small-sized file.

The first transmission section 50 transmits a variety of data including a moving image, a captured image, or the like between the server 12 and the portable terminal 14.

Figure 3:
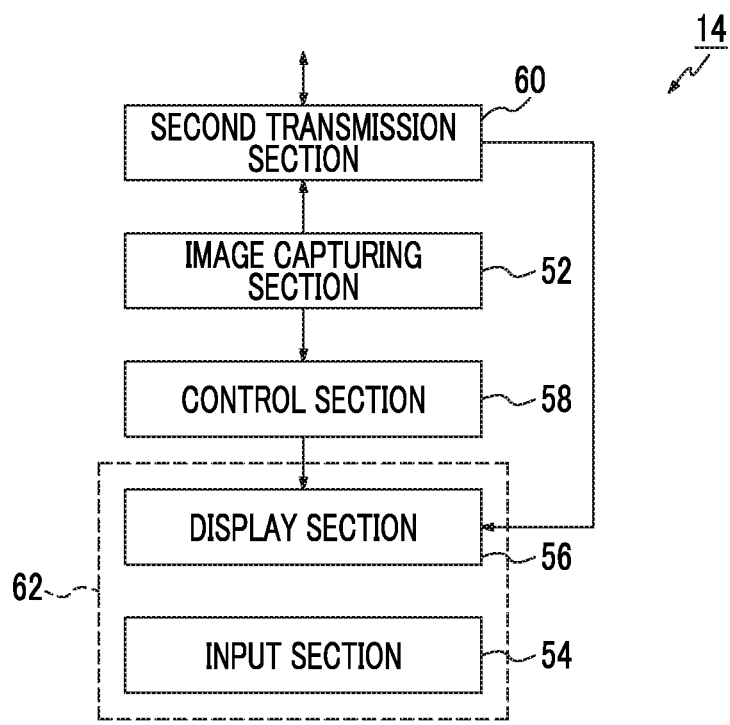
FIG. 3 is a block diagram illustrating an embodiment of an internal configuration of a portable terminal shown in FIG. 1.

Subsequently, FIG. 3 is a block diagram illustrating an embodiment of an internal configuration of the portable terminal shown in FIG. 1. The portable terminal 14 is a smart phone, a tablet terminal or the like which has one or more CPU (not shown in the Figure) and is used by a user. The CPU performs by loaded various programs thereon and as shown in FIG. 3, an image capturing section 52, an input section 54, a display section 56, a control section 58, and a second transmission section 60 is controlled.

The image capturing section 52 captures an output image (moving image print) which is output based on a composite image from the printer 16, for example, to acquire a captured image.

The input section 54 receives a variety of instructions input from a user, and corresponds to an instruction reception section of the invention.

The display section 56 displays a variety of images, information, or the like.

In this embodiment, it is assumed that a touch panel 62 configures the input section 54 and the display section 56.

The control section 58 controls display of the display section 56. The control section 58 performs a control, in a case where an output image is captured by the image capturing section 52, so that an AR reproduction moving image generated based on the captured image is reproduced and displayed on the display section 56.

Here, in a case where the moving image is displayed on the display section 56, the control section 58 may reproduce the moving image using an AR technique (AR reproduction), or may reproduce the moving image without using the AR technique (normal reproduction). In a case where the moving image is reproduced based on the AR reproduction, the control section 58 performs a control so that a captured output image is displayed on the display section 56 and the moving image is reproduced in a displayed portion of the output image displayed on the display section 56. Further, in a case where the moving image is reproduced based on the normal reproduction, the control section 58 performs a control so that the moving image is reproduced on the entire surface of the display section 56 or within a window of an arbitrary size thereof.

The second transmission section 60 transmits a variety of data including a moving image, a captured image, or the like between the portable terminal 14 and the server 12.

Figure 4:
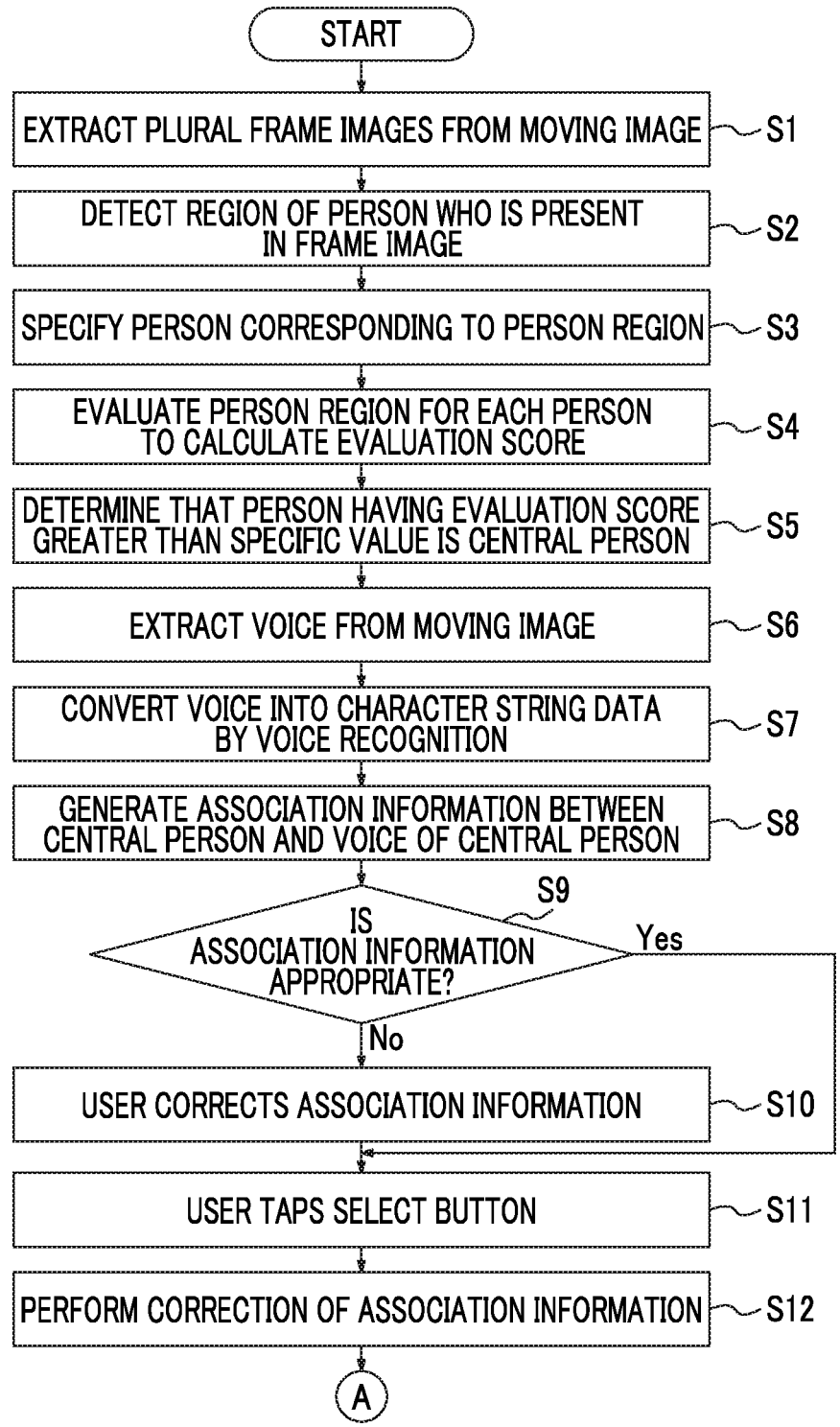
FIG. 4 is a flowchart illustrating an example of an operation of the image processing device in a case where AR content is generated and an output image (moving image print) of a composite image is output.
Figure 5:
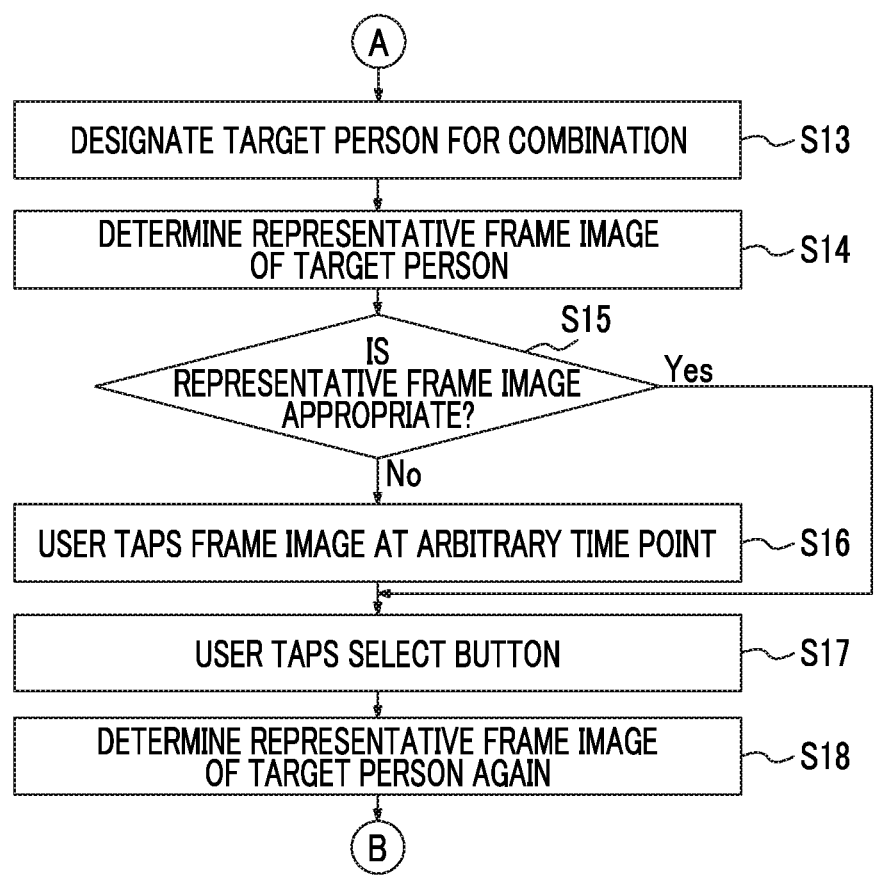
FIG. 5 is a flowchart illustrating an example of the operation of the image processing device subsequent to the flowchart of FIG. 4.
Figure 6:
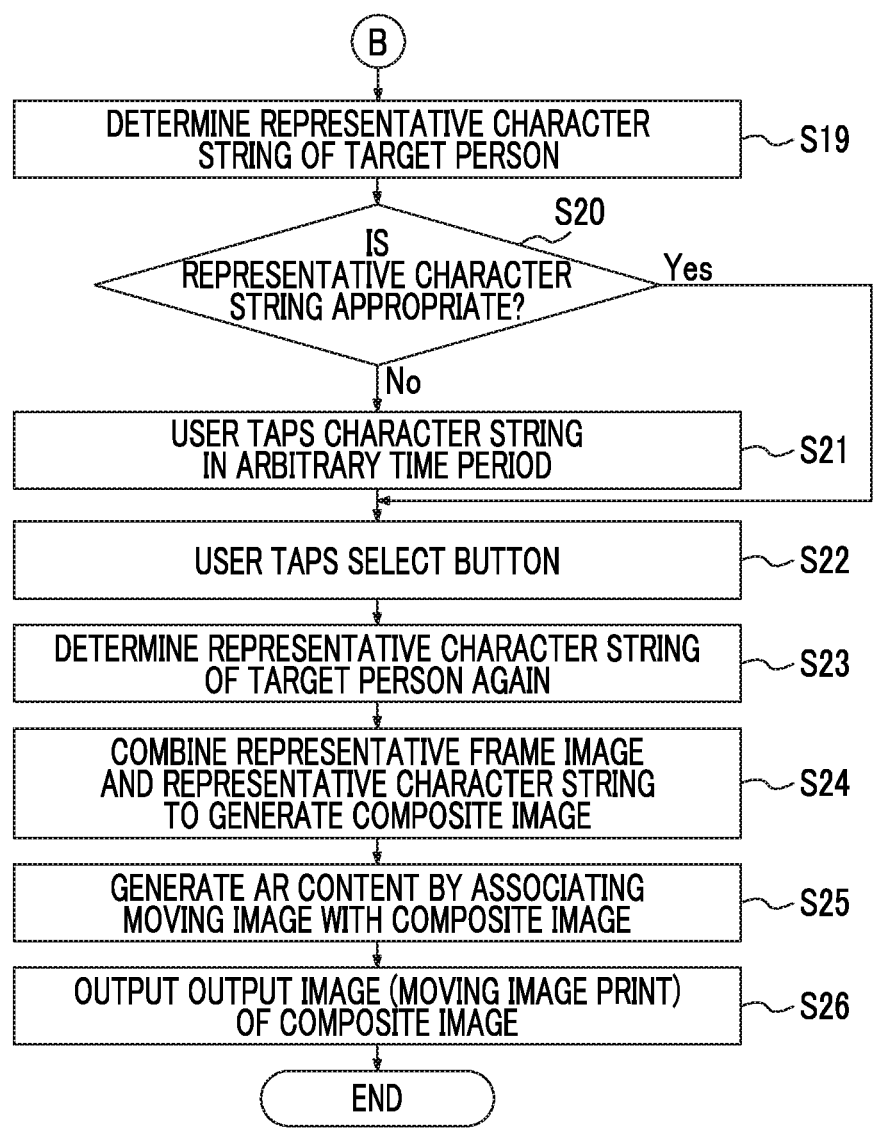
FIG. 6 is a flowchart illustrating an example of the operation of the image processing device subsequent to the flowchart of FIG. 5.

Next, an operation of the image processing device 10 in a case where AR content is generated and an output image (moving image print) of a composite image is output will be described with reference to a flowchart shown in FIGS. 4 to 6.

First, a user operates the touch panel 62 (input section 54) of the portable terminal 14 to select a moving image (moving image data) and to input a transmission (upload) instruction of the selected moving image.

The moving image for which the transmission instruction is performed is transmitted from the portable terminal 14 to the server 12 through the network 18 by the second transmission section 60. The server 12 receives the moving image transmitted from the portable terminal 14 through the first transmission section 50 and stores the received moving image in the storage section 42.

Subsequently, plural frame images (image data) are extracted from the moving image stored in the storage section 42 by the frame image extraction section 20 (step S1).

Then, a region of a person who is present in each frame image extracted from the moving image by the frame image extraction section 20 is detected as a person region by the person region detection section 22 (step S2), and a person corresponding to the person region detected by the person region detection section 22 is specified by the person specifying section 23 (step S3).

Subsequently, the person regions of the plural frame images detected by the person region detection section 22 are evaluated for each person specified by the person specifying section 23 by the person evaluation section 24 to calculate evaluation scores for the persons specified in the moving image (step S4). In a case where the evaluation score for each person specified by the person specifying section 23 is greater than a specific value, the central person determination section 26 determines that the person is a central person in the moving image (step S5). Here, a case where the evaluation score is greater than the specific value may include any one of a case where an evaluation score is greater than a specific value with respect to any one of plural frames, a case where an average value of evaluation scores for all or a predetermined number of frames is greater than a specific value, or a case where an integrated value of evaluation scores for frames from the beginning of the moving image is greater than a specific value.

Then, a voice is extracted from the moving image by the voice extraction section 28 (step S6), and the voice extracted from the moving image by the voice extraction section 28 is converted into character string data by voice recognition by the voice recognition section 30 (step S7).

Subsequently, association information between the central person determined by the central person determination section 26 and the voice of the central person extracted from the moving image by the voice extraction section 28 is generated by the association section 32 (step S8).

The association information generated by the association section 32 is transmitted to the portable terminal 14 from the server 12.

In the portable terminal 14, association information between an icon indicating the central person and a character string corresponding to at least a part of character string data of the voice of the central person is displayed as a list on the touch panel 62 (display section 56) based on the association information generated received from the server 12.

Data of the icon of the central person and the character string corresponding to the character string data of the voice of the central person, or the like may be transmitted from the server 12 to the portable terminal 14, or instead, data provided in the portable terminal 14 may be used.

Figure 8:
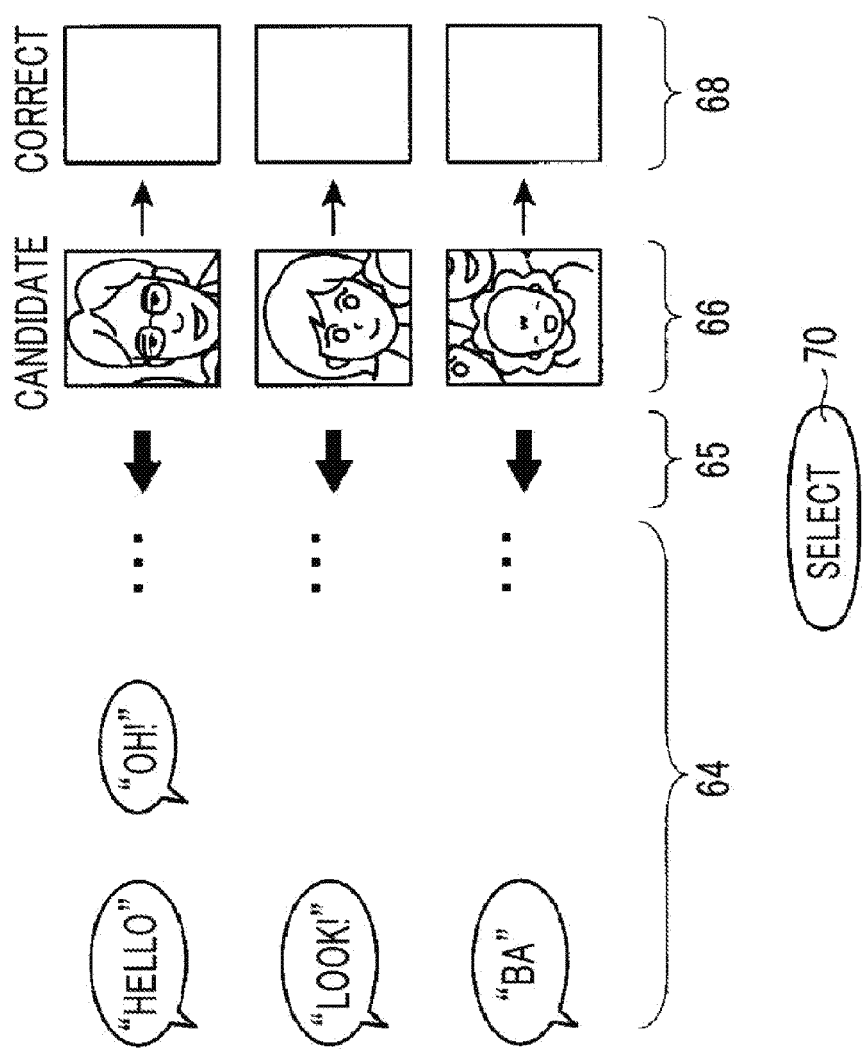
FIG. 8 is a conceptual diagram illustrating an example of a screen for correcting association information between central persons and voices thereof.

For example, in the case of an example shown in FIG. 8, character strings 64 corresponding to character string data of voices of respective central persons are arranged in a form of being surrounded by text balloons in a time series manner on the left side of the figure, and icons 66 of a father, a mother and a baby are displayed as candidates of central persons associated with the respective character strings on the right side thereof. Further, leftward arrows indicating that each person and each character string are associated with each other are displayed as association information 65. In this example, "Hello!" and "Oh!" are displayed as character strings corresponding to character string data of a voice of the father, "Where?" is displayed as a character string corresponding to character string data of a voice of the mother, and "Ba" is displayed as a character string corresponding to character string data of a voice of the baby. The association information 65 does not need to be displayed as the arrow, and may be any type of indication capable of allowing a user to visually recognize that each person and a character string are arranged and displayed in a vertical or horizontal direction, for example, so that the person and the character string are associated with each other by the display of the display section 56.

The character strings 64 corresponding to the character string data of the voices of the respective central persons may be arranged in a time series manner instead of the displayed form, and for example, the user may operate a scrollbar or the like to appropriately display a desired character string to be read.

Subsequently, with respect to association information which is displayed as a list on the touch panel 62 (display section 56), the user operates the touch panel 62 (input section 54) to input a correction instruction for correcting the association information.

In the example shown in FIG. 8, blank icons 68 for correcting the association information between the central persons and the voices of the central persons are provided on the right side of the icons 66 of the central persons.

Here, the user determines whether or not the association information between the central persons and the voices of the central persons is correct (step S9).

In a case where the user considers that the association information between the central persons and the voices of the central persons is correct (Yes in step S9), the user taps a select button 70 (step S11). In this case, the association information is not corrected.

On the other hand, in a case where the user considers that the association information is wrong (No in step S9), the user drags and drops the icons 66 of the central persons to the blank icons 68 considered to be correct by the user to correct the association information (step S10), and then, taps the select button 70 (step S11). In this case, the association information is corrected according to the change made by the user.

The association information correction instruction is transmitted to the server 12 from the portable terminal 14.

In the server 12, the association information is corrected according to the association information correction instruction by the association section 32 (step S12).

Then, the user operates the touch panel 62 (input section 54) to select an icon of a central person for which the user desires to perform a process of generating a composite image (image data) from among the icons of the central persons which are displayed as the list on the touch panel 62 (display section 56). Thus, a target person designation instruction for designating a central person corresponding to the icon selected by the user as a target person for combination is input (step S13).

The target person designation instruction is transmitted to the server 12 from the portable terminal 14.

In the server 12, the representative frame image determination section 34 determines a representative frame image from among frame images where the target person is present according to the target person designation instruction (step S14).

The representative frame image determined by the representative frame image determination section 34 is transmitted to the portable terminal 14 from the server 12 together with frame images, other than the representative frame image, which are frame images where the target person is present.

In the portable terminal 14, the representative frame image of the target person and the other frame images where the target person is present, received from the server 12, are displayed as a list on the touch panel 62 (display section 56).

Subsequently, the user selects a frame image at an arbitrary time point, which the user desires to select as a representative frame image of the target person, from among the representative frame image of the target person and the other frame images where the target person is present, displayed on the touch panel 62 (display section 56). Thus, a frame image designation instruction for designating the frame image selected by the user is input.

Figure 9:
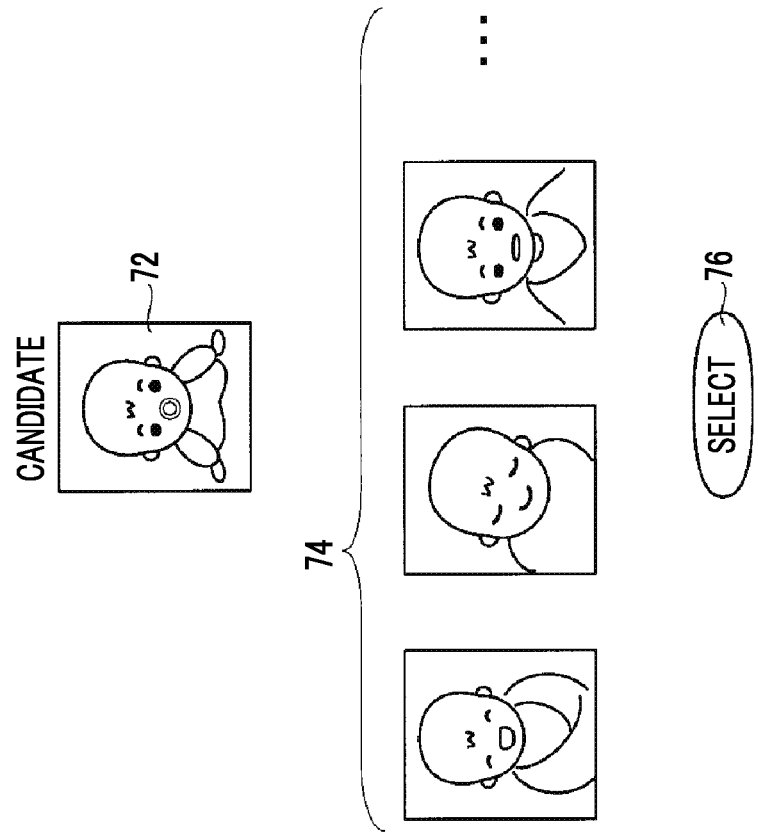
FIG. 9 is a conceptual diagram illustrating an example of a screen for correcting representative frame images of a target person.

For example, as shown in FIG. 9, a candidate of a representative frame image 72 of the target person is displayed in an upper portion of FIG. 9, and other frame images 74 where the target person is present are displayed in a lower portion of FIG. 9. In this example, the representative frame of the baby is displayed in the upper portion of the figure, and the other frame images where the baby is present are displayed in the lower portion of the figure.

Here, the user determines whether or not the representative frame image 72 is appropriate (step S15).

In a case where the user considers that the representative frame image 72 is appropriate (Yes in step S15), the user taps a select button 76 (step S17). In this case, the representative frame image is not corrected.

On the other hand, in a case where that user considers that the representative frame image 72 is not appropriate (No in step S15), the user taps a frame image at an arbitrary time point which the user desires to select as a representative frame image of the target person from among the other frame images 74 where the target person is present (step S16), and taps the select button 76 (step S17). In this case, the representative frame image is corrected according to the change made by the user.

The frame image designation instruction is transmitted to the server 12 from the portable terminal 14.

In the server 12, the representative frame image determination section 34 re-determines a frame image at an arbitrary time point designated by the user according to the frame image designation instruction as a representative frame image of the target person (step S18).

Subsequently, the representative character string determination section 36 determines a representative character string of the target person from among the character strings corresponding to the character string data of the voice of the target person, according to a target person designation instruction (step S19).

The character string data of the representative character string of the target person determined by the representative character string determination section 36 is transmitted to the portable terminal 14 from the server 12 together with character string data of character strings other than the representative character string, which is character string data of character strings corresponding to voice data of the voice of the target person.

In the portable terminal 14, a representative character string corresponding to the character string data of the representative character string of the target person, received from the server 12, and the character strings, other than the representative character string, which are the character strings corresponding to the voice data of the voice of the target person are displayed as a list on the touch panel 62 (display section 56).

Then, the user selects a character string at an arbitrary time point, which the user desires to combine with the representative frame image of the target person, from among the representative character string of the target person and the other character strings corresponding to the character string data of the voice of the target person, displayed on the touch panel 62 (display section 56). Thus, a character string designation instruction for designating the character string selected by the user is input.

Figure 10:
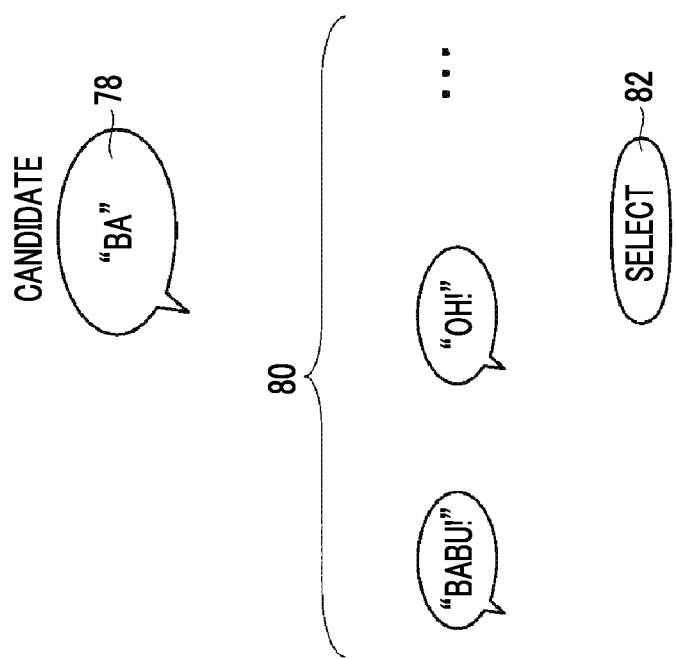
FIG. 10 is a conceptual diagram illustrating an example of a screen for correcting representative character strings of a target person.

For example, as shown in FIG. 10, a candidate of a representative character string 78 of the target person is displayed in an upper portion of FIG. 10, and other character strings 80 corresponding to the character string data of the voice of the target person are displayed in a lower portion of FIG. 10. In this example, "Ba" is displayed in an upper portion of the figure as the representative character string of the baby, and "Babu!", "Oh!", and the like are displayed on the lower side in the Figure as the other character strings of the character string data of the voice of the baby.

Here, the user determines whether or not the representative character string 78 of the target person is appropriate (step S20).

In a case where the user considers that the representative character string 78 of the target person is appropriate (Yes in step S20), the user taps a select button 82 (step S22). In this case, the representative character string is not corrected.

On the other hand, in a case where the user considers that the representative character string 78 of the target person is not appropriate (No in step S20), the user taps a character string in an arbitrary time period which the user desires to combine as a representative frame image of the target person from among the other character strings 80 corresponding to the character string data of the voice of the target person (step S21), and then, taps the select button 82 (step S22). In this case, the representative character string is corrected according to the change made by the user.

The character string designation instruction is transmitted to the server 12 from the portable terminal 14.

In the server 12, the representative character string determination section 36 re-determines a character string in an arbitrary time period designated by the user according to the character string designation instruction as a representative character string of the target person (step S23).

Subsequently, the combination section 38 combines the representative frame image of the target person and a character image corresponding to the representative character string of the target person based on association information according to the target person designation instruction to generate a composite image (image data) (step S24).

Figure 11:
FIG. 11 is a conceptual diagram illustrating an example of a composite image formed by combining a representative frame image of a target person and a representative character string of the target person in a text balloon form.

For example, as shown in FIG. 11, the representative frame image of the target person and the character image of the representative character string of the target person are combined in a text balloon form of which a tail is directed toward a side where the target person is present. In this example, the representative frame image of the baby and the character string of "Ba" which is the representative character string of the baby are combined in a text balloon form of which a tail is directed toward a side where the baby is present.

The shape of the text balloon, and the direction, color, size, position, and the like of the text balloon may be freely corrected by the user.

In this way, in the image processing device 10, by combining a frame image and a character image of a character string corresponding to character string data of a voice of a person who is present in the frame image, it is possible to generate a composite image with an enhanced attraction. Further, since association between persons and voices thereof is performed using association information, and since central persons and voices of the central persons are displayed on the display section 56, it is possible to visually recognize correspondence between the persons and the voices, and to easily and freely select frame images and character string data corresponding to voices.

Further, association between the central persons and the voices of the central persons is performed, and a representative frame image and a representative character string of a target person are automatically determined. The user may select the automatically determined representative frame image and representative character string of the target person as they are, or may freely select a frame image at an arbitrary time point and a character string at an arbitrary time period from among other frame images and other character strings of the target person, displayed on the display section 56.

In this way, it is possible to combine a frame image at an arbitrary time point when a target person is present and a character image of a character string corresponding to character string data of a voice of the target person at an arbitrary time period, and thus, it is possible to generate various composite images. Further, the user can simply select the frame image at an arbitrary time point when the target person is present and a character image of a character string corresponding to a voice, at an arbitrary time period, of a person who is present in the frame image for combination.

Subsequently, the content generation section 40 generates AR content in which a moving image is associated with a composite image combined by the combination section 38 or its specifying information (step S25). The AR content generated by the content generation section 40, that is, the composite image or its specifying information is stored in the storage section 42 in association with a moving image corresponding thereto as a management marker of the composite image.

Here, the user operates the touch panel 62 (input section 54) to set the size of a printed matter, the number of printed sheets, or the like, and to input a print output instruction of the composite image.

The print output instruction is transmitted to the server 12 from the portable terminal 14.

A composite image corresponding to the received print output instruction is transmitted to the printer 16 from the server 12, and an output image (moving image print) of the composite image is output by the printer 16 (step S26).

The output image is delivered to the user.

As described above, the AR content in which the moving image and the composite image or its specifying information are associated with each other are stored in the storage section 42, and the output image of the composite image is output.

Figure 7:
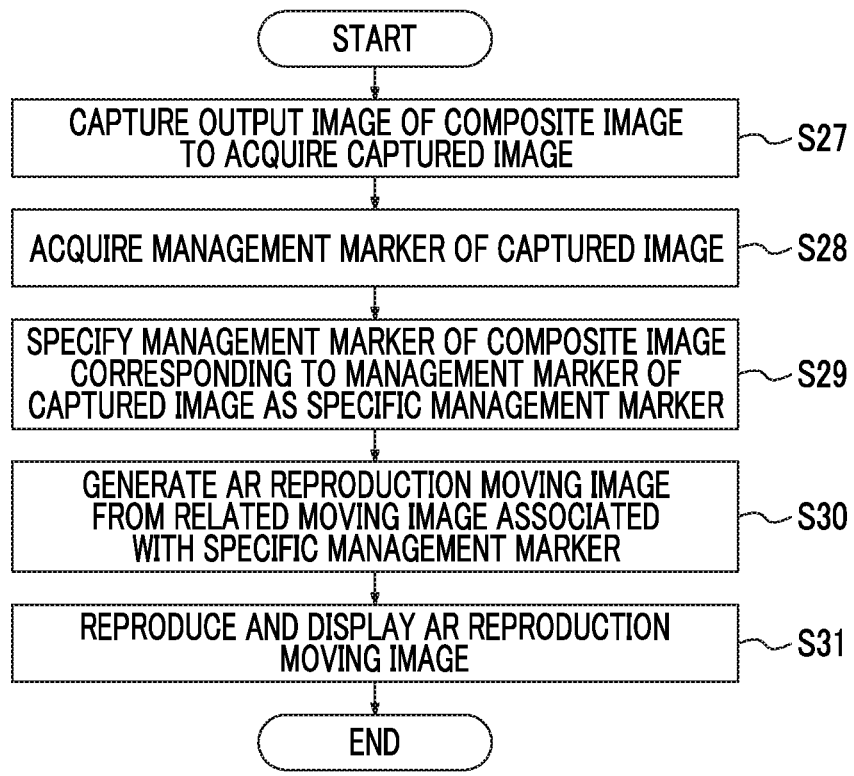
FIG. 7 is a flowchart illustrating an example of an operation of the image processing device in a case where a moving image for AR reproduction is generated to be reproduced and displayed.

Next, an operation of the image processing device 10 in a case where an AR reproduction moving image is generated and the generated AR reproduction moving image is reproduced and displayed will be described with reference to a flowchart shown in FIG. 7.

First, an output image of a composite image is captured by the image capturing section 52 to acquire a captured image (image data) (step S27). The captured output image is displayed on the touch panel 62 (display section 56) of the portable terminal 14.

The acquired captured image is transmitted to the server 12 from the portable terminal 14 through the network 18 by the second transmission section 60. The server 12 receives the captured image transmitted from the portable terminal 14 through the first transmission section 50.

Subsequently, image analysis of the captured image is performed by the captured image analysis section 44 to acquire a management marker of the captured image (step S28).

Then, a management marker of a composite image corresponding to the management marker of the captured image among management markers of composite images stored in the storage section 42 is specified as a specific management marker by the management marker specifying section 46 (step S29).

Then, an AR reproduction moving image (moving image data) is generated from a related moving image associated with the specific management marker by the moving image processing section 48 (step S30).

Then, the AR reproduction moving image generated by the moving image processing section 48 is transmitted to the portable terminal 14 from the server 12. The portable terminal 14 receives the AR reproduction moving image transmitted from the server 12.

After the AR reproduction moving image is received, the received AR reproduction moving image is reproduced and displayed in a display portion of the output image displayed on the touch panel 62 (display section 56) of the portable terminal 14 under the control of the control section 58 (step S31).

As described above, if the output image of the composite image is captured, the management marker of the composite image corresponding to the management marker of the captured image is specified, and the AR reproduction moving image is generated from the related moving image associated with the specific management marker and is reproduced and displayed on the portable terminal 14.

In a case where the output image of the composite image is output, for example, an access key formed by a character string including numbers or letters may be printed in the output image of the composite image. The access key is uniquely determined for each user. As the user inputs the access key, in a case where the specific management marker is specified from the management markers of the composite images stored in the storage section 42, it is possible to define the specific management marker in a range of the management markers of the composite images associated with the moving image transmitted to the server 12 by each user.

Further, in a case where a character string corresponding to character string data of a voice of a target person is combined with a frame image of the target person in a text balloon form, by changing the shape, color, or the like of the text balloon according to a character string of the access key, it is possible to use the text balloon instead of the access key. In this case, since it is not necessary to print the access key on the output image of the composite image, it is possible to prevent disfigurement. Further, since the shape, color, or the like of the text balloon is automatically recognized, the user can reduce an effort for manually inputting the access key.

Further, a configuration in which the portable terminal 14 is used is not limiting, and instead, a configuration in which a control device of a personal computer or the like that includes the image capturing section 52, the input section 54, the display section 56, the control section 58, and the second transmission section 60 is used may be used.

Further, as described above, for example, the representative frame image of the target person and the representative character string of the target person are combined. Accordingly, in a case where a voice extracted from a moving image by the voice extraction section 28 is converted into character string data, the voice recognition section 30 preferentially converts the voice of the target person, among the voices extracted from the moving images, into character string data, to thereby make it possible to enhance conversion efficiency.

Further, in a case where a target person is designated from a central person and a non-subject person, for example, a character image of a character string corresponding to character string data of a voice of the target person and a frame image of the central person may be combined for a composite image.

In this case, the association section 32 further determines that a person who is not present in the frame image and whose voice extracted from the moving image occurs more frequently than a predetermined specific value as a non-subject person, and generates association information between the non-subject person and a voice of the non-subject person. Further, the display section 56 displays association information between icons indicating the central person and the non-subject person and character strings corresponding to at least a part of character string data of the voices of the central person and the non-subject person, based on the association information generated by the association section 32. The input section 54 receives a target person designation instruction for designating a central person and a non-subject person corresponding to the icons selected by the user from the icons as target persons for combination. Further, the combination section 38 reads a combination character string corresponding to character string data of a voice of the target person in an arbitrary time period when the voice of the target person is present according to the target person designation instruction based on the association information, and reads a combination frame image at an arbitrary time point when the target person is present. Further, the combination section 38 combines a character image corresponding to the combination character string and the combination frame image to generate a composite image. Thus, since voices of the target person are displayed only by designating the target person, it is possible to easily and freely select a voice to be combined from among the voices of the target person. Here, it is also possible to select a voice of the non-subject person. Further, since the faces of all the central persons are displayed, it is possible to easily and freely select a face to be combined.

Further, a voice uttered by a person other than the central person is also included in a moving image. The person other than the central person may be a photographer or a person who is merely slightly reflected in the moving image. Generally, even though a voice of the photographer is included in the moving image, in most cases, the photographer is not reflected in the moving image.

In this case, the association section 32 further determines that a person who is not a central person and whose voice extracted from the moving image occurs more frequently than a predetermined specific value as a non-subject person, and generates association information between the non-subject person and a voice of the non-subject person. In this case, the non-subject person is not present in the moving image or is merely slightly reflected, but the combination section 38 combines a combination frame image at an arbitrary time point when the target person is present and a combination character string corresponding to character string data of a voice of one arbitrary person among a central person and a non-subject person in an arbitrary time period in a text balloon form, for example, to generate a composite image. Thus, it is possible to easily and freely combine a non-subject person who is not present in the moving image or a character image of a character string corresponding to character string data of a voice of another central person who is not the target person, and to generate various composite images.

In a case where a non-subject person is designated as a target person, in a case where the voice extraction section 28 has directivity, it is possible to estimate a position when a combination character string is uttered as a voice, and to perform combination in a text balloon form of which a tail is based on the directivity to generate a composite image. Further, in a case where the voice extraction section 28 does not have directivity and a position when utterance is made cannot be estimated, and in a case where the voice extraction section 28 has directivity but a position where utterance is made cannot be estimated, it is possible to estimate that the non-subject person is a photographer, and to combine a character image in a text balloon form of which a tail is directed toward a lower side of a composite image to generate a composite image.

As shown in FIG. 12, on the display section 56, an icon (for example, a gray icon) corresponding to a non-subject person may be displayed, and association information between the non-subject person and a character string corresponding to a voice of the non-subject person may be displayed.

Further, in case of capturing a moving image using a smart phone, when a person captured in the moving image utters a voice, for example, a photographer may tap the person who utters the voice, displayed on the touch panel 62 (display section 56) to associate the person who utters the voice and the voice uttered by the person. In this case, data indicating association between the person who is present in the moving image and the voice of the person is attached to the moving image as supplementary information based on exchangeable image file format (Exif) or the like.

Accordingly, the association section 32 determines whether or not the moving image has the data indicating the association between the person who is present in the moving image and the voice thereof as the supplementary information. Further, when it is determined that the moving image has the association indication data, association information between a central person and a voice of the central person may be generated based on the association indication data of the moving image. Thus, it is possible to enhance the accuracy of the association information.

Further, in a case where a moving image is reproduced and displayed, a character string corresponding to character string data converted by the voice recognition section 30 may be displayed on the touch panel 62 (display section 56) of the portable terminal 14 at the same time when a voice in the moving image is reproduced.

In the above-described embodiments, an AR content in which a moving image and a composite image combined by the combination section 38 or its specifying information are associated with each other is generated, but the invention is not limited thereto, and only the composite image may be generated.

The device of the invention may be configured so that the respective components of the device are formed by dedicated-use hardware, or may be configured by a computer in which the respective components are programmed.

The method of the invention may be executed by a program that causes a computer to execute the respective steps thereof, for example. Further, a computer-readable recording medium that stores the program may be provided.

Hereinbefore, the embodiments of the invention have been described in detail, but the invention is not limited to the embodiments, and may include various improvements or modifications in a range without departing from the spirit of the invention.

What is claimed is:

1. An image processing device comprising:
a frame image extraction section that extracts a plurality of frame images from a moving image;
a person region detection section that detects at least a partial region of a person who is present in each frame image as a person region;
a person specifying section that specifies a person corresponding to the detected person region;
a person evaluation section that evaluates the person region in at least a part of the plurality of extracted frame images for each specified person and calculates an evaluation score for the specified person in the moving image;
a central person determination section that determines, in a case where the evaluation score for the specified person is greater than a specific value, that the specified person is a central person in the moving image;
a voice extraction section that extracts a voice from the moving image;
a voice recognition section that converts the voice into character string data by voice recognition;
an association section that generates association information between the central person and a voice of the central person;
a display section that displays association information between an icon indicating the central person and a character string corresponding to at least a part of character string data of the voice of the central person, based on the association information generated by the association section;
an instruction reception section that receives an instruction input from a user; and
a combination section that combines the frame image and a character image corresponding to the character string,
wherein the instruction reception section further receives a target person designation instruction for designating a central person corresponding to an icon selected from among the icons by the user as a combination target person, and
wherein the combination section further reads a combination frame image at an arbitrary time point when the target person is present according to the target person designation instruction, reads a combination character string corresponding to character string data of a voice of the target person in an arbitrary time period based on the association information displayed on the display section, and combines the combination frame image and a character image corresponding to the combination character string to generate a composite image.

2. The image processing device according to claim 1, wherein the instruction reception section further receives a correction instruction for correcting, with respect to the association information displayed on the display section, the association information, and
wherein the association section further corrects the association information according to the correction instruction.

3. The image processing device according to claim 1, further comprising:
a representative frame image determination section that determines a representative frame image from among the frame images where the target person is present according to the target person designation instruction; and
a representative character string determination section that determines a representative character string from among the character strings corresponding to the character string data of the voice of the target person according to the target person designation instruction, wherein the combination section combines the representative frame image and a character image corresponding to the representative character string.

4. The image processing device according to claim 3, wherein the representative frame image determination section determines a frame image where at least one of a tone, brightness, and blurring is within a specific range from among the frame images where the target person is present as the representative frame image.

5. The image processing device according to claim 3, wherein the representative frame image determination section determines a frame image where at least one of a size and a direction of the face of the target person is within a specific range and an expression of the target person is smiling from among the frame images where the target person is present as the representative frame image.

6. The image processing device according to claim 3, wherein the representative frame image determination section determines a frame image where at least one of a talking scene, a large amount of movement scene, and a loud voice scene of the target person is present from among the frame images where the target person is present as the representative frame image.

7. The image processing device according to claim 3, wherein the representative character string determination section determines a character string corresponding to character string data of a voice where at least one of a loudness and a pitch of the voice of the target person is within a specific range from among the character strings corresponding to the character string data of the voice of the target person as the representative character string.

8. The image processing device according to claim 3, wherein the representative character string determination section determines a character string corresponding to character string data of a voice containing a most frequently-used word from among the character strings corresponding to the character string data of the voice of the target person as the representative character string.

9. The image processing device according to claim 3, wherein the display section further displays the representative frame image where the target person is present and a frame image, other than the representative frame image, which is a frame image where the target person is present,
wherein the instruction reception section further receives a frame image designation instruction for designating a frame image input from the user among the frame images displayed on the display section, and
wherein the representative frame image determination section further re-determines the frame image designated by the user according to the frame image designation instruction as the representative frame image.

10. The image processing device according to claim 3, wherein the display section further displays the representative character string and a character string, other than the representative character string, which is a character string corresponding to the voice data of the voice of the target person,
wherein the instruction reception section further receives a character string designation instruction for designating a character string input from the user among the character strings displayed on the display section, and
wherein the representative character string determination section further re-determines the character string designated by the user according to the character string designation instruction as the representative character string.

11. The image processing device according to claim 3, wherein the voice recognition section preferentially converts the voice of the target person among the voices extracted from the moving image into character string data.

12. The image processing device according to claim 1, wherein the voice extraction section further performs noise canceling for removing noise from the voice extracted from the moving image.

13. The image processing device according to claim 1, wherein the association section determines a gender and an age of the central person from a person region of a frame image where the central person is present, determines, from a pitch of the voice of the central person, the gender and age of a person corresponding to the voice, and generates the association information so that the gender and age of the central person match the gender and age of the person corresponding to the voice.

14. The image processing device according to claim 1, wherein in a case where the association information is generated, the association section does not use a voice in a sound range other than a sound range of a voice of a human being.

15. The image processing device according to claim 1, wherein the association section determines whether or not the moving image includes data indicating association between a person who is present in the moving image and a voice of the person who is present in the moving image as supplementary information, and generates, when it is determined that the moving image includes the data indicating the association, the association information based on the data indicating the association.

16. The image processing device according to claim 1, wherein the combination section combines the character string in at least one form of a text balloon, a telop, and a subtitle.

17. The image processing device according to claim 1, wherein the combination section changes a style of type of the character string according to content of the character string.

18. The image processing device according to claim 1, wherein the combination section generates a composite image including a plurality of frame images which is combined with the character images of the character strings.

19. An image processing device comprising:
a frame image extraction section that extracts a plurality of frame images from a moving image;
a person region detection section that detects at least a partial region of a person who is present in each frame image as a person region;
a person specifying section that specifies a person corresponding to the detected person region;
a person evaluation section that evaluates the person region in at least a part of the plurality of extracted frame images for each specified person and calculates an evaluation score for the specified person in the moving image;
a central person determination section that determines, in a case where the evaluation score for the specified person is greater than a specific value, that the specified person is a central person in the moving image;

a voice extraction section that extracts a voice from the moving image;

a voice recognition section that converts the voice into character string data by voice recognition;

an association section that generates association information between the central person and a voice of the central person, determines that a person who is not present in the frame image and whose voice extracted from the moving image occurs more frequently than a specific value as a non-subject person, and generates association information between the non-subject person and a voice of the non-subject person;

a display section that displays association information between icons indicating the central person and the non-subject person and a character string corresponding to at least a part of character string data of the voices of the central person and the non-subject person, based on the association information generated by the association section;

an instruction reception section that receives an instruction input from a user; and a combination section that combines the frame image and a character image corresponding to the character string, wherein the instruction reception section further receives a target person designation instruction for designating a central person or a non-subject person corresponding to an icon selected from among the icons by the user as a combination target person, and wherein the combination section further reads a combination character string corresponding to character string data of a voice of the target person in an arbitrary time period when the voice of the target person is present based on the association information displayed on the display section according to the target person designation instruction, reads a combination frame image at an arbitrary time point when the central person is present, and combines a character image corresponding to the combination character string and the combination frame image to generate a composite image.

20. An image processing device comprising:

a frame image extraction section that extracts a plurality of frame images from a moving image;

a person region detection section that detects at least a partial region of a person who is present in each frame image as a person region;

a person specifying section that specifies a person corresponding to the detected person region;

a person evaluation section that evaluates the person region in at least a part of the plurality of extracted frame images for each specified person and calculates an evaluation score for the specified person in the moving image;

a central person determination section that determines, in a case where the evaluation score for the specified person is greater than a specific value, that the specified person is a central person in the moving image;

a voice extraction section that extracts a voice from the moving image;

a voice recognition section that converts the voice into character string data by voice recognition;

an association section that generates association information between the central person and a voice of the central person, determines that a person who is not present in the frame image and whose voice extracted from the moving image occurs more frequently than a specific value as a non-subject person, and generates association information between the non-subject person and a voice of the non-subject person;

a display section that displays association information between an icon indicating the central person and a character string corresponding to at least a part of character string data of the voice of the central person, based on the association information generated by the association section;

an instruction reception section that receives an instruction input from a user; and a combination section that combines the frame image and a character image corresponding to the character string, wherein the instruction reception section further receives a target person designation instruction for designating a central person corresponding to an icon selected from among the icons by the user as a combination target person, and wherein the combination section further reads a combination frame image at an arbitrary time point when the target person is present according to the target person designation instruction, reads a combination character string corresponding to character string data of a voice of an arbitrary one of the central person and the non-subject person in an arbitrary time period based on the association information displayed on the display section, and combines the combination frame image and a character image corresponding to the combination character string to generate a composite image.

21. The image processing device according to claim 20, wherein the combination section further combines the combination character string in a text balloon form of which a tail is directed toward a lower side of the composite image.

22. An image processing method using the image processing device according to claim 1, the method comprising the steps of:

extracting a plurality of frame images from a moving image, by a frame image extraction section;

detecting at least a partial region of a person who is present in each frame image as a person region, by a person region detection section;

specifying a person corresponding to the detected person region, by a person specifying section;

evaluating the person region in at least a part of the plurality of extracted frame images for each specified person and calculating an evaluation score for the specified person in the moving image, by a person evaluation section;

determining, in a case where the evaluation score for the specified person is greater than a specific value, that the specified person is a central person in the moving image, by a central person determination section;

extracting a voice from the moving image, by a voice extraction section;

converting the voice into character string data by voice recognition, by a voice recognition section;

generating association information between the central person and a voice of the central person, by an association section;

displaying association information between an icon indicating the central person and a character string corresponding to at least a part of character string data of the voice of the central person, based on the association information generated by the association section, by a display section;

receiving a correction instruction for correcting, with respect to the association information displayed on the display section, the association information input from a user, by an instruction reception section;

further correcting the association information according to the correction instruction, by the association section;

further receiving a target person designation instruction for designating a central person corresponding to an icon selected from among the icons by the user as a combination target person, by the instruction reception section; and reading a combination frame image at an arbitrary time point when the target person is present according to the target person designation instruction, reading a combination character string corresponding to character string data of a voice of the target person in an arbitrary time period based on the association information displayed on the display section, and combining the combination frame image and a character image corresponding to the combination character string to generate a composite image, by a combination section.

23. The image processing method according to claim 22, further comprising the steps of:

receiving a correction instruction for correcting, with respect to the association information displayed on the display section, the association information, by the instruction reception section; and correcting the association information according to the correction instruction, by the association section.

24. The image processing method according to claim 22, further comprising the steps of:

determining a representative frame image from among the frame images where the target person is present according to the target person designation instruction, by a representative frame image determination section; and determining a representative character string from among the character strings corresponding to the character string data of the voice of the target person according to the target person designation instruction, by a representative character string determination section, wherein the combination section combines the representative frame image and a character image corresponding to the representative character string.

25. The image processing method according to claim 24, further comprising the steps of:

displaying the representative frame image where the target person is present and a frame image, other than the representative frame image, which is a frame image where the target person is present, by the display section;

receiving a frame image designation instruction for designating a frame image input from the user among the frame images displayed on the display section, by the instruction reception section; and re-determining the frame image designated by the user according to the frame image designation instruction as the representative frame image, by the representative frame image determination section.

26. The image processing method according to claim 24, further comprising the steps of:

displaying the representative character string and a character string, other than the representative character string, which is a character string corresponding to the character string data of the voice of the target person, by the display section;

receiving a character string designation instruction for designating a character string input from the user among the voice displayed on the display section, by the instruction reception section; and re-determining the character string designated by the user according to the character string designation instruction as the representative character string, by the representative character string determination section.

27. An image processing method using the image processing device according to claim 19, the method comprising the steps of:

extracting a plurality of frame images from a moving image, by a frame image extraction section;

detecting at least a partial region of a person who is present in each frame image as a person region, by a person region detection section;

specifying a person corresponding to the detected person region, by a person specifying section;

evaluating the person region in at least a part of the plurality of extracted frame images for each specified person and calculating an evaluation score for the specified person in the moving image, by a person evaluation section;

determining, in a case where the evaluation score for the specified person is greater than a specific value, that the specified person is a central person in the moving image, by a central person determination section;

extracting a voice from the moving image, by a voice extraction section;

converting the voice into character string data by voice recognition, by a voice recognition section;

generating association information between the central person and a voice of the central person, determining that a person who is not present in the frame image and whose voice extracted from the moving image occurs more frequently than a predetermined specific value as a non-subject person, and generating association information between the non-subject person and a voice of the non-subject person, by an association section;

displaying association information between icons indicating the central person and the non-subject person and a character string corresponding to at least a part of character string data of the voices of the central person and the non-subject person, based on the association information generated by the association section, by a display section;

receiving a target person designation instruction for designating a central person or a non-subject person corresponding to an icon selected from among the icons by the user as a combination target person, by an instruction reception section; and reading a combination character string corresponding to character string data of a voice of the target person in an arbitrary time period when the voice of the target person is present based on the association information displayed on the display section according to the target person designation instruction, reading a combination frame image at an arbitrary time point when the central person is present, and combining a character image corresponding to the combination character string and the combination frame image to generate a composite image, by a combination section.

28. An image processing method using the image processing device according to claim 20, the method comprising the steps of:

extracting a plurality of frame images from a moving image, by a frame image extraction section;

detecting at least a partial region of a person who is present in each frame image, by a person region detection section;

specifying a person corresponding to the detected person region, by a person specifying section;

evaluating the person region in at least a part of the plurality of extracted frame images for each specified person and calculating an evaluation score for the specified person in the moving image, by a person evaluation section;

determining, in a case where the evaluation score for the specified person is greater than a specific value, that the specified person is a central person in the moving image, by a central person determination section;

extracting a voice from the moving image, by a voice extraction section;

converting the voice into character string data by voice recognition, by a voice recognition section;

generating association information between the central person and a voice of the central person, determining that a person who is not present in the frame image and whose voice extracted from the moving image occurs more frequently than a predetermined specific value as a non-subject person, and generating association information between the non-subject person and a voice of the non-subject person, by an association section;

displaying association information between an icon indicating the central person and a character string corresponding to at least a part of character string data of the voice of the central person, based on the association information generated by the association section, by a display section;

receiving a correction instruction for correcting, with respect to the association information displayed on the display section, the association information input from a user, by an instruction reception section;

further correcting the association information according to the correction instruction, by the association section;

further receiving a target person designation instruction for designating a central person corresponding to an icon selected from among the icons by the user as a combination target person, by the instruction reception section; and reading a combination frame image at an arbitrary time point when the target person is present according to the target person designation instruction, reading a combination character string corresponding to character string data of a voice of an arbitrary one of the central and the non-subject person in an arbitrary time period based on the association information displayed on the display section, and combining the combination frame image and a character image corresponding to the combination character string to generate a composite image, by a combination section.

29. A non-transitory computer-readable recording medium that stores a program that causes a computer to execute the steps of the image processing method according to claim 22.

* * * * *